(12) United States Patent
Junqueira et al.

(10) Patent No.: US 9,946,745 B2
(45) Date of Patent: *Apr. 17, 2018

(54) LOCK-FREE TRANSACTIONAL SUPPORT FOR LARGE-SCALE STORAGE SYSTEMS

(71) Applicant: Excalibur IP, LLC, New York, NY (US)

(72) Inventors: Flavio Junqueira, Catalunya (ES); Benjamin Reed, Morgan Hill, CA (US); Maysam Yabandeh, Catalunya (ES)

(73) Assignee: Excalibur IP, LLC, Sunnyvale, CA (US)

( * ) Notice: Subject to any disclaimer, the term of this patent is extended or adjusted under 35 U.S.C. 154(b) by 520 days.

This patent is subject to a terminal disclaimer.

(21) Appl. No.: 14/662,504

(22) Filed: Mar. 19, 2015

(65) Prior Publication Data
US 2015/0193493 A1    Jul. 9, 2015

Related U.S. Application Data

(63) Continuation of application No. 13/283,543, filed on Oct. 27, 2011, now Pat. No. 8,990,177.

(51) Int. Cl.
*G06F 17/30* (2006.01)

(52) U.S. Cl.
CPC .. *G06F 17/30353* (2013.01); *G06F 17/30359* (2013.01)

(58) Field of Classification Search
None
See application file for complete search history.

(56) References Cited

U.S. PATENT DOCUMENTS 7,293,024 B2    11/2007  Baylilss et al.
2004/0236746 A1*  11/2004  Lomet ............... G06F 17/30551
(Continued)

OTHER PUBLICATIONS

Peng, D. et al., "Large-scale Incremental Processing Using Distributed Transactions and Notifications", Google, Inc. 2010 (14 pages).
(Continued)

*Primary Examiner* — Grace Park
*Assistant Examiner* — Cheryl M Schechtman
(74) *Attorney, Agent, or Firm* — Hickman Palermo Becker Bingham LLP (57) ABSTRACT

Described is a reliable and efficient design for a transactional status oracle ("ReTSO"), which supports large-scale storage systems. ReTSO uses a centralized scheme and implements snapshot isolation, a property that guarantees that read operations read a consistent snapshot of the data store. The centralized scheme of ReTSO enables a lock-free commit algorithm that prevents unreleased locks of a failed transaction from blocking other transactions. Each transaction submits the identifiers of modified rows to the ReTSO, the transaction is committed only if none of the modified rows is committed by a concurrent transaction, and a log of the committed transaction is cached. To recover from failures, before a client is notified of a change, the change cached is first persisted into a write-ahead log, such that the memory state can be fully reconstructed by reading from the write-ahead log. Furthermore, ReTSO implements a lazy, auto-garbage collector hash map that reduces the number of memory accesses per request.

20 Claims, 7 Drawing Sheets

(56) References Cited

U.S. PATENT DOCUMENTS

2006/0167960 A1 7/2006 Lomet
2006/0235905 A1 10/2006 Kapur
2011/0153566 A1 6/2011 Larson et al.

OTHER PUBLICATIONS

Mohan, C. et al., "Aries: A Transaction Recovery Method Supporting Fine-Granularity Locking and Partial Rollbacks Using Write-Ahead Logging" ACM Trans. Database Syst. Mar. 1992—Abstract (1 page).
Lin, Y. et al., "Snapshot Isolation and Integrity Constraints in Replicated Databases", ACM Transactions on Database Systems, Feb. 2009 (54 pages).
Chang, F. et al., "A Distributed Storage System for Structured Data", ACM Trans. Comput. Syst. 26:4:1-4:26, Jun. 2008 (2p pages).
Berenson, H. et al., "A Critique of ANSI SQL Isolation Levels" ACM SIGMOD 95 dated Jun. 1995 (12 pages).
U.S. Appl. No. 13/283,543, filed Oct. 27, 2011, Office Action dated Jan. 29, 2013.
U.S. Appl. No. 13/283,543, filed Oct. 27, 2011, Notice of Allowance dated Nov. 20, 2014.
U.S. Appl. No. 13/283,543, filed Oct. 27, 2011, Final Office Action dated Jun. 14, 2013.

\* cited by examiner

LOCK-FREE TRANSACTIONAL SUPPORT FOR LARGE-SCALE STORAGE SYSTEMS

PRIORITY CLAIM

This application claims the benefit under 35 U.S.C. § 120 as a Continuation of application Ser. No. 13/283,543, filed Oct. 27, 2011, titled "Lock-Free Transactional Support for Large-Scale Storage Systems", the entire contents of which are hereby incorporated by reference for all purposes as if fully set forth herein. The applicants hereby rescind any disclaimer of claim scope in the parent application or the prosecution history thereof and advise the USPTO that the claims in this application may be broader than any claim in the parent application.

FIELD OF DISCLOSURE

The present invention relates to a reliable and efficient design for transactional support in large-scale storage systems. SUGGESTED GROUP ART UNIT: 2157; SUGGESTED CLASSIFICATION: 707/803.

BACKGROUND

A transactional commit for large-scale storage systems, such as BigTable, use lock-based, distributed algorithms such as two-phase commit. Lock-based algorithms are inefficient when an unreleased lock of a failed transaction prevents other transactions from making progress. Commercial data storage systems often implement Snapshot Isolation (SI) since it allows for high concurrency between transactions. SI guarantees that all reads of a transaction are performed on a snapshot of the database that corresponds to a valid database state with no concurrent transaction. To implement SI, the database maintains multiple row versions of the data and the transactions observe different row versions of the data depending on the start time of the transaction.

In an SI-based system, two general approaches are used for detecting a conflict between two concurrent transactions that write into the same data element (e.g., row): 1) a lock-based approach, which locks modified rows to prevent concurrent transactions from modifying the locked rows, or 2) a lock-free approach with centralized Transaction Status Oracle (TSO) that monitors the commits of all transactions. In lock-based approaches, the locks of an incomplete transaction, executed on a failed client, may prevent other transactions from making progress during the recovery period.

It is, however, challenging to efficiently design a TSO that is not a bottleneck for system scalability and which guarantees the reliability of its data in presence of the failure of the node that hosts TSO. Large distributed storage systems, therefore, implement lock-based transactional commit algorithms, missing the benefits of lock-free approaches.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The data in large-scale storage systems are distributed over numerous servers and are updated by numerous clients. Client crashes are frequent in such environments. In such environments, supporting transactions is critical to enable the system to cope with faulty clients. Commercial data storage systems often implement Snapshot Isolation ("SI"), since SI allows for high concurrency between transactions. SI guarantees that all reads of a transaction ("txn") are performed on a snapshot of the database that corresponds to a valid database state with no concurrent transaction. To implement SI, the system maintains multiple row versions of the data. The transactions observe different row versions of the data depending on the start time of the transaction. Advantageously, in an SI implementation, the writes of a transaction do not block the reads.

Two concurrent transactions still conflict if both write to the same data element, e.g., a database row. The conflict is detected by the SI implementation, and at least one of the transactions is aborted. Two general approaches for detecting the conflict are 1) using a centralized transaction status oracle ("TSO") that monitors the commits of all transactions, or 2) locking the modified rows in a distributed way to prevent the concurrent transactions from overwriting the data. In a lock-based approach, the locks involved in a transaction of a failed client may prevent other transactions from making progress during the recovery period.

In a centralized approach, each transaction submits the identifiers of modified rows to the TSO, the transaction is committed only if none of the modified rows is committed by a concurrent transaction, and a log of the committed transaction is cached. The centralized approach has the advantage of being lock-free, thus not blocking active transactions due to incomplete transactions. It is, however, challenging to efficiently design a TSO that is not a bottleneck and guarantees the reliability of the data in the presence of node failures.

A reliable and efficient implementation of TSO ("ReTSO") is presented. Generally, to recover from failures, each transactional change written into volatile memory should be first persisted into a non-volatile write-ahead log ("WAL"), from which the volatile memory state can be fully reconstructed. Since commit requests should be serviced atomically, the long service time has an inverse impact on the throughput of ReTSO. Therefore, all the high-latency operations, including writing into the WAL, could create TSO a bottleneck for system scalability. ReTSO addresses the bottleneck challenge by performing asynchronous writes into the WAL and delaying the response to the client till the acknowledgment of the write is received. Furthermore, ReTSO implements a lazy, auto-garbage collector hash map that reduces the number of memory accesses per request. It should be noted that, in one embodiment of the invention, a request to persist each transactional change to the WAL is sent, but the change is made potentially before the WAL is updated. In such an embodiment, no reply is sent to the client until acknowledgement of the persistence to the WAL is received. In this way, memory state observed by the client may be reconstructed. For example, after a sudden crash, less than all of the memory state might be recovered because some changes were being written into the WAL, but all of the changes that were observed by the client (due to the reply having been sent to the client) will be recovered.

Network Topology

Figure 1:
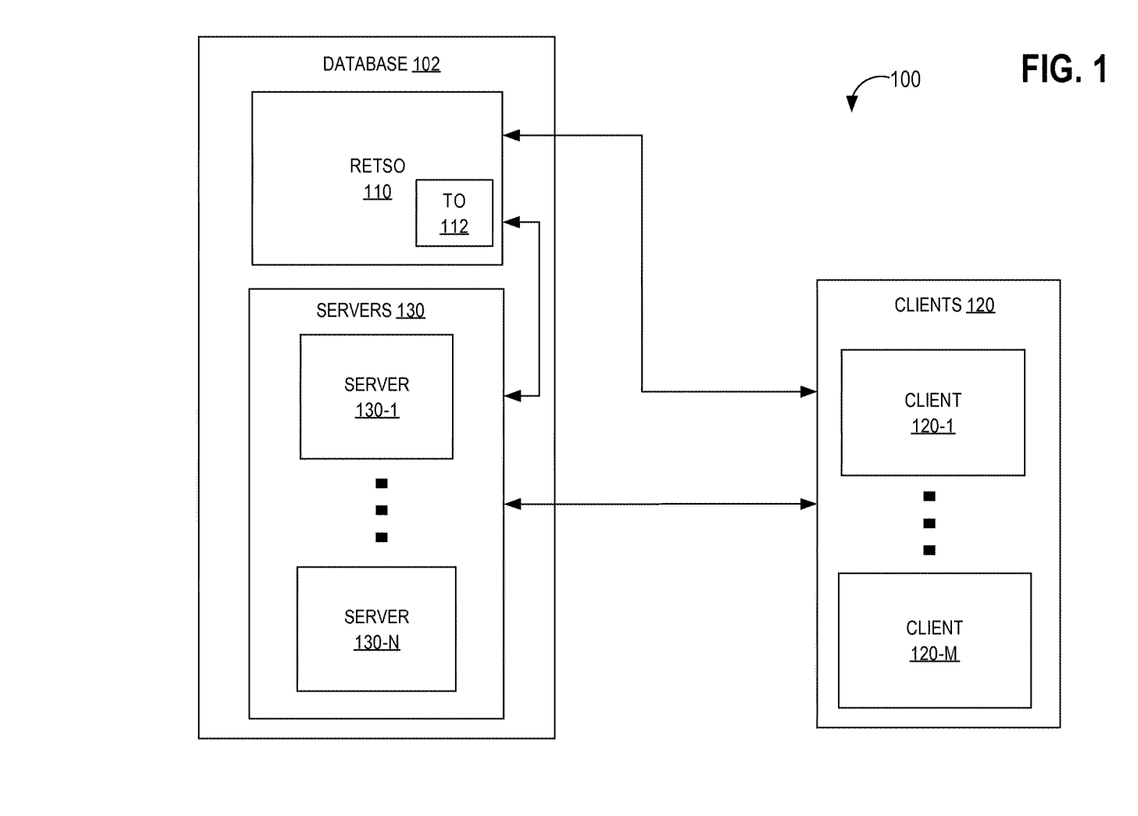
FIG. 1 is a block diagram that illustrates the network topology of a lock-free transactional storage system, according to one embodiment.

FIG. 1 illustrates a network topology of a lock-free transactional storage system 100, according to one embodiment. According to this embodiment, the network topology includes, but is in no way limited to, a database 102, a ReTSO 110, a Timestamp Oracle ("TO") 112, one or more transaction clients ("clients") 120-1 through 120-M (collectively referred to as "clients 120"), and one or more servers 130-1 through 130-N (collectively referred to as "servers 130"). In this illustrated embodiment ReTSO 110, clients 120 and servers 130 execute on separate devices. However, in other embodiments, one or more components may execute on the same device.

Database 102 includes, but is in no way limited to, ReTSO 110, TO 112, and servers 130. Database 102 may run on one or more devices. In the embodiment illustrated in FIG. 1, database 102 is distributed across many devices, e.g., one for each component respectively.

In the embodiment illustrated in FIG. 1, ReTSO 110 is communicatively coupled with TO 112, clients 120, and servers 130. ReTSO 110, upon request, serves start timestamp requests, commit requests, and queries about commit timestamps.

TO 112, in this illustrated embodiment, is contained within ReTSO 110. However, in other embodiments, TO 112 may be external to ReTSO 110, and merely communicatively coupled with ReTSO 110, transaction clients 120, and servers 130. TO 112 generates timestamps and guarantees that each timestamp is unique and assigned in increasing order.

Clients 120, in this embodiment, are communicatively coupled to ReTSO 110 and servers 130. In the illustrated embodiment, clients 120 are distributed across several computing devices. However, in another embodiment, clients 120 may be one single computing device and/or may be executed on the same device as one or more other components (ReTSO 110, TO 112, and servers 130). Client 120-1 reads/writes data elements from/to multiple regions on different servers 130. To read and write row versions of data elements, clients 120 submit get/put requests to servers 130. Clients 120 drive transactions and may also be responsible for cleaning up the temporary database updates performed by their transactions. To clean up each row after a commit, server 130-1 updates the row version, which contains the starting timestamp, with the commit timestamp and deletes the corresponding value in the Pending Write column. However, in the embodiment illustrated in FIG. 4, discussed later in detail, ReTSO 110 includes a row commit time column which is empty until the transaction is committed, at which time the row commit time is set to the commit time of the transaction. Thus, in the embodiment illustrated in FIG. 4, the row version is the starting timestamp of the transaction. To clean up each row after an abort, server 130-1 deletes the row version of each row and deletes the respective value in the Pending Write column. Therefore, an unclean row is a row on which a committed or aborted transaction has operated, but either the row version has not been updated or the Pending Write column value has not been deleted. The failure of client 120-1, hence, may leave the future transactions that will read from the unclean rows uncertain about the commit status of data being written by transactions of failed client 120-1.

Servers 130 are communicatively coupled with ReTSO 110 and clients 120. In the illustrated embodiment, servers 130 are distributed across several computing devices. However, in other embodiments, servers 130 may be one single computing device and/or may be executed on the same device with one or more other components (ReTSO 110, TO 112, clients 120). Servers 130 store/persist the data that comprises the data elements (cells, rows, tables, lists, sets, subsets, etc.). In one embodiment, groups of consecutive rows in one or more tables are split into multiple regions, and each region is maintained by a separate server. Servers 130 also may be augmented to maintain an in-memory "Pending Write" column, which contains the value that will be committed to the row or cell if there is not a write-write conflict between the updating transaction and some other co-pending transaction.

Snapshot Isolation

Figure 2:
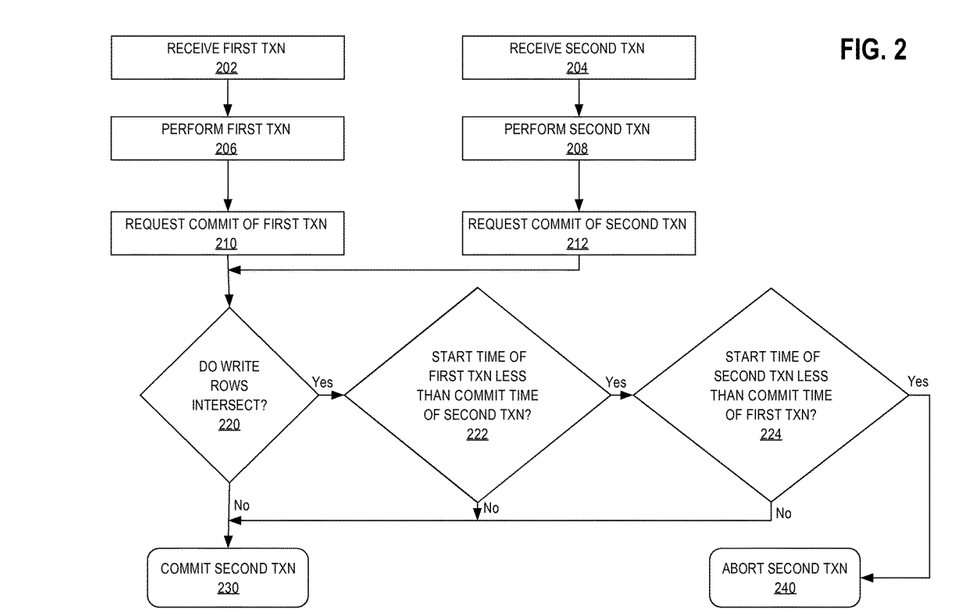
FIG. 2 is a flowchart demonstrating snapshot isolation illustrated by two competing transactions, according to one embodiment.

FIG. 2 is a flowchart demonstrating snapshot isolation illustrated by two competing transactions, according to one embodiment. A transaction is an atomic unit of execution and may contain multiple read and write operations to database 102. To implement snapshot isolation, each transaction receives two timestamps: one before the transaction reads the rows affected by the transaction and one before the transaction commits the modified data. Timestamps are assigned by TO 112, and hence provide a commit order between transactions. In other words, a particular transaction observes all the modifications of other transactions that have committed before the particular transaction starts. While FIG. 2 illustrates steps according to one embodiment, other embodiments may omit, add to, reorder, and/or modify any of the steps shown.

In steps 202 and 204, client 120-1 and client 120-M request a transaction by server 130-1, TO 112 generates two timestamps marking the beginning of each transaction, and the timestamps are stored in each transaction respectively. In steps 206 and 208, server 130-1 performs the transactions on rows R1 and R2, respectively, where R1 may intersect with R2.

In step 210, client 120-1 finishes performing the first transaction before client 120-M finishing the second transaction, and client 120-1 attempts to commit the updated rows, R1. In step 220, ReTSO 110 determines whether rows R1 and R2 intersect. If rows R1 and R2 intersect, then control passes to step 222; otherwise, control passes to step 230. In step 222, ReTSO 110 determines whether the start time of the first transaction is less than the commit time of the second transaction. If the start time of the first transaction is less than the commit time of the second transaction, then control passes to step 224; otherwise, control passes to step 230. In step 224, ReTSO 110 determines whether the start time of the second transaction is less than the commit time of the first transaction. If the start time of the second transaction is less than the commit time of the first transaction, then control passes to step 240; otherwise, control passes to step 230. If no write-write conflict exists, then ReTSO 110 successfully commits the first transaction and, upon request by client 120-1, server 130-1 cleans up rows R1.

In step 208, server 130-1 performs the second transaction and updates rows R2. In step 212, client 120-M requests ReTSO 110 commit updated rows R2. If server 130-1 determines in step 202 that rows R1 and rows R2 intersect; determines in step 222 that the starting timestamp of the first transaction is less than the commit time of the second transaction; and determines in step 224 that the starting timestamp of the second transaction is less than the commit time of the first transaction; then ReTSO 110 aborts the second transaction in step 240. Otherwise, if the inquiries of any of steps 220-224 produce a negative result, then ReTSO 110 commits the second transaction in step 230.

Reliable and Efficient Transaction Status Oracle

In one embodiment of the centralized implementation of SI, ReTSO 110 receives commit requests accompanied by the set of the identifiers of modified rows, R, from clients 120. Since ReTSO 110 has observed the modified rows of previously committed transactions, ReTSO 110 has enough information to determine whether there are any write-write conflicts on the modified row(s) R of the transaction whose commitment is currently being requested (the "current transaction"). For each row in R, ReTSO 110 determines whether the last commit time previously stored in association with that row is greater than the start time of the current transaction. If the result of ReTSO's determination is positive, then ReTSO 110 aborts the current transaction. Otherwise, ReTSO 110 commits the current transaction. In other embodiments ReTSO 110 instructs clients 120 to cleanup the temporary changes of the committed or the aborted transactions. In still another embodiment, if ReTSO's determination is to commit the current transaction, ReTSO 110 stores information about the current transaction's committed rows, including the commit timestamp of the rows modified by the current transaction, within volatile memory allocated to ReTSO 110.

In another embodiment, after commit or abort, client 120-1 is responsible for cleaning up the temporary database updates performed by the transaction. Failure of client 120-1, in such an embodiment, leaves the future transactions that will read from the uncleaned rows, uncertain about the commit status of the written data. For each transaction reading a row r, the reading transaction seeks to determine whether the last commit time of that row (as previously stored by ReTSO 110) is less than the start time of the reading transaction. In other words, for each row r, the reading transaction, txn-r, seeks to determine whether $Tc(txn-f) < Ts(txn-r)$, where txn-f is a transaction that has written to row r, $Tc(txn-f)$ is the commit timestamp of transaction txn-f, and $Ts(txn-r)$ is the start timestamp of txn-r. The results for this determination are provided by ReTSO 110, which stores the status of all committed transactions. (ReTSO 110 can also benefit from the row identifier for efficient implementation.) In one embodiment, ReTSO 110 may determine that a row is not committed if a writing transaction does not have a commit timestamp on a given row. If there is a commit timestamp for a writing transaction, then, in one embodiment, ReTSO 110 determines whether the commit timestamp of the writing transaction is less than the starting time of the reading transaction.

In one embodiment of SI using ReTSO 110 on top of multiple servers, groups of consecutive rows in one or more tables are split into multiple regions, and each region is maintained by a separate server. Client 120-1 may read/write cell data from/to multiple regions on different servers 130 when executing a transaction. To read and write row versions, clients 120 submit get/put requests to servers 130. The row versions in a table row are determined by timestamps. To generate timestamps, ReTSO 110 uses TO 112, which guarantees that each timestamp is unique and assigned in increasing order. Finally, servers 130 may be augmented to also maintain an in-memory (e.g., in volatile random access memory) "PendingWrite" column.

Figure 3:
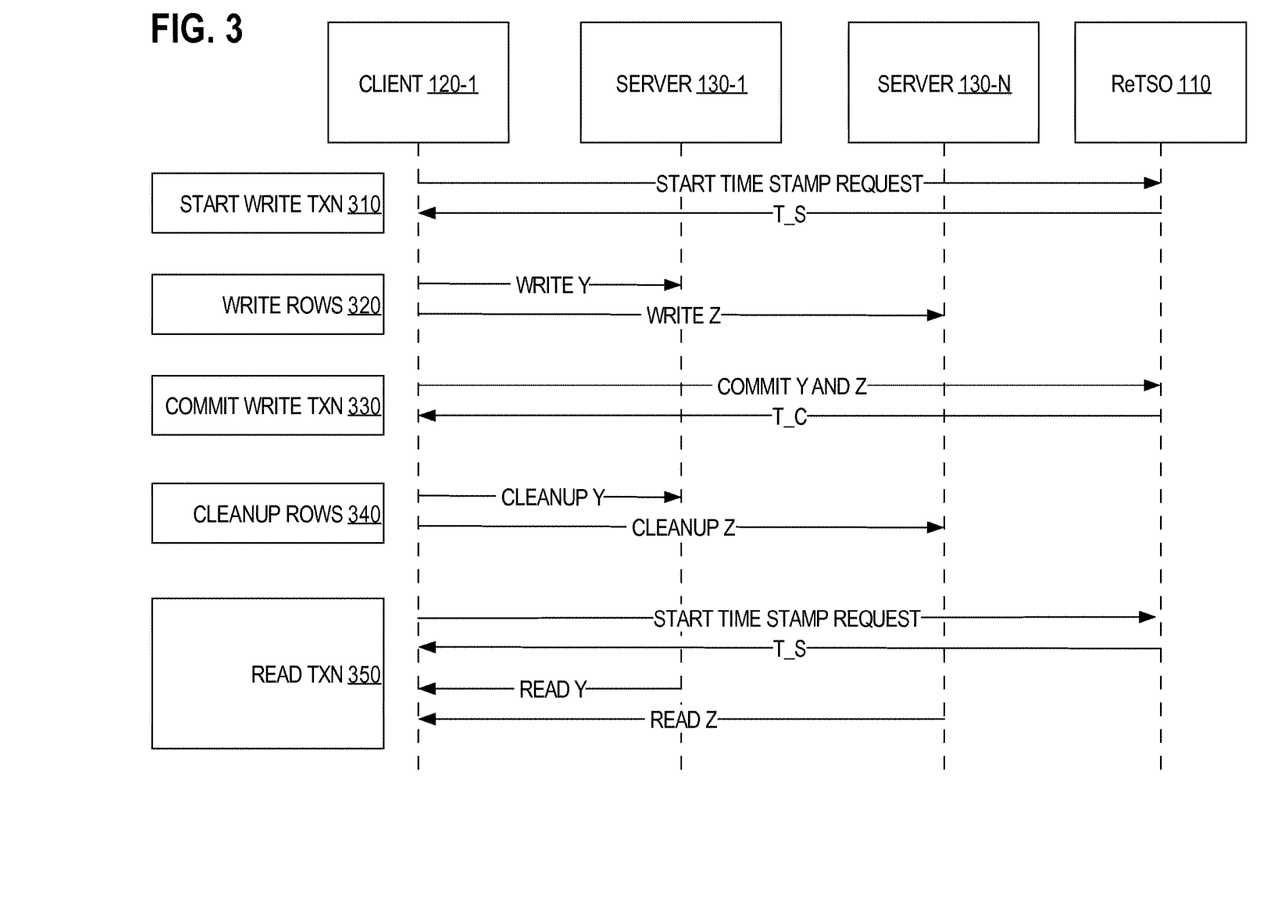
FIG. 3 is a sequence diagram of a successful commit, according to one embodiment.

FIG. 3 is a sequence diagram of a successful commit, according to one embodiment. While FIG. 3 illustrates exemplary steps according to one embodiment, other embodiments may omit, add to, reorder, and/or modify any of the steps shown. In step 310, client 120-1, seeking to begin a transaction, requests a timestamp from ReTSO 110. ReTSO 110 then responsively returns T_S, which represents the transaction's starting timestamp. In step 320, a portion of the transaction is performed by writing new data with a row version identifier equal to the transaction starting timestamp, (T_S). In the embodiment illustrated in FIG. 3, write requests for rows Y and Z are issued to server 130-1 and 130-N, respectively. Each write request may also write into the in-memory Pending Write column.

In step 330, after client 120-1 has written values to rows Y and Z, client 120-1 requests the commitment of rows Y and Z by submitting, to ReTSO 110, a commit request that includes a starting timestamp T_S as well as the list of all the modified rows, Y and Z. If ReTSO 110 commits the transaction in response to the commit request, then ReTSO 110 returns the commit timestamp, T_C, to client 120-1. The whole transaction is then committed and client 120-1 proceeds to step 340 by performing single-row cleanups on rows Y and Z, using the received timestamp T_C. Otherwise, if ReTSO 110 aborts the transaction, client 120-1 still proceeds to step 340, cleaning up the modified rows.

In step 340, after the write transaction commits or aborts, client 120-1 cleans up all the modified rows. To clean up each row after a commit, client 120-1 issues a request to server 130-1 and server 130-N to update the row versions of rows Y and Z from T_S to T_C and delete the values in the in-memory Pending Write column associated with rows Y and Z. Alternatively, to clean up each row after an abort, client 120-1 issues a request to server 130-1 and server 130-N to delete both (a) the row versions of rows Y and Z created by client 120-1, and (b) the values in the in-memory Pending Write column of rows Y and Z.

In step 350, each read transaction txn-r observes the last committed data for each row before starting timestamp, T_S, of txn-r. Thus, the commit timestamp, δ, of any row will be less than T_S for any row read by txn-r. However, if the value of the Pending Write column for any of the rows was set by a write transaction, txn-w, and if Ts(txn-w)<Ts(txn-r), where Ts(txn-w) and Ts(txn-r) are the starting timestamps of transactions txn-w and txn-r respectively, then the row is unclean and has not necessarily been committed before Ts(txn-r). As discussed above, a row may have been committed, but due to a faulty or slow client the row was not cleaned up. Server 130-1 or client 120-1 may then verify whether the transaction was successfully committed with ReTSO 110, which is discussed in detail under "TRANSACTION QUERIES."

Illustration of a Transaction Status Oracle

Figure 4:
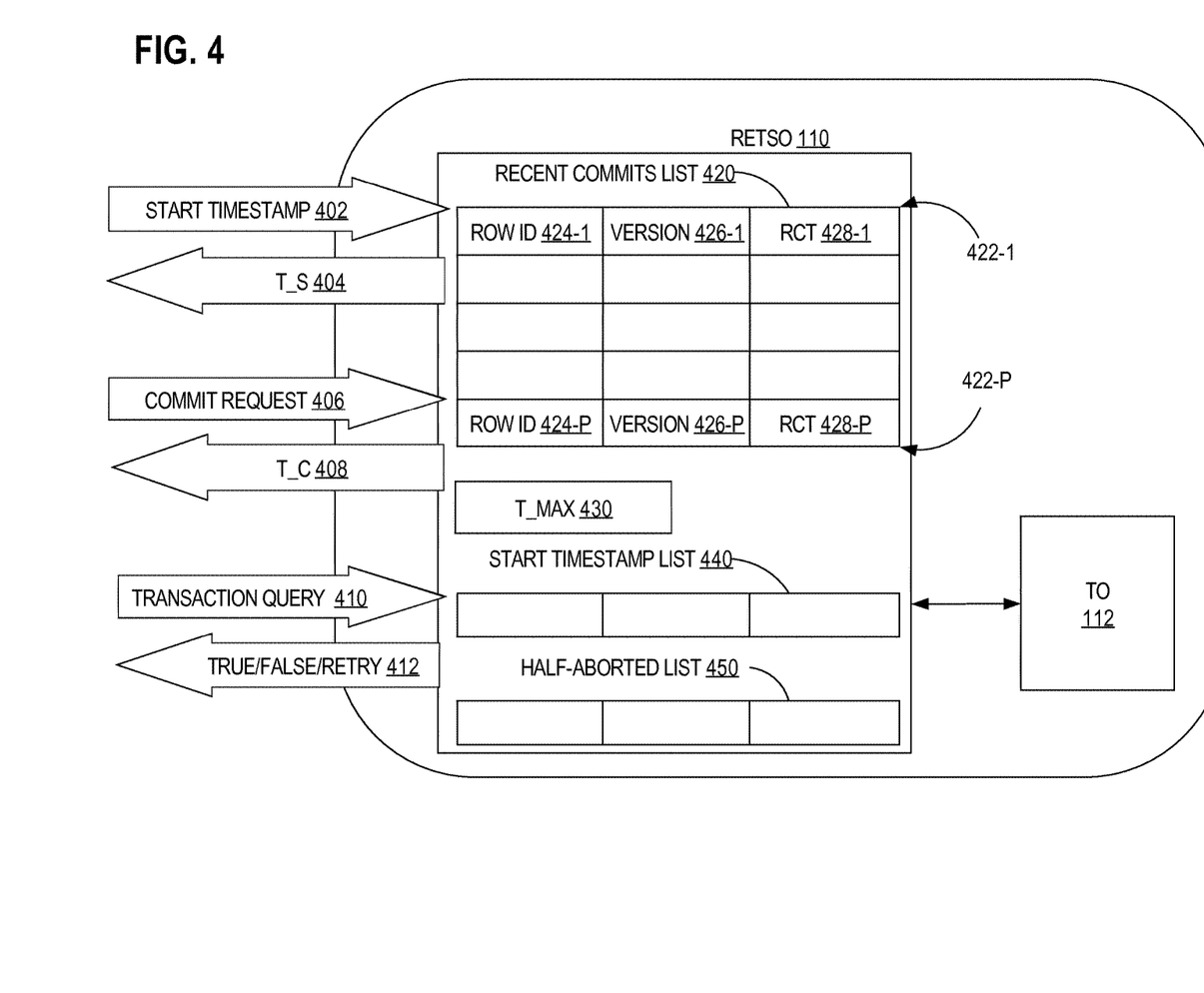
FIG. 4 is a block diagram that illustrates a transaction status oracle, according to one embodiment.

FIG. 4 is a block diagram that illustrates an example of ReTSO 110, according to one embodiment. ReTSO 110 serves three types of requests: start timestamp requests 402, commit requests 406, and queries about commit timestamps 410. In response to the first type of request, ReTSO 110 returns a starting timestamp (T_S) 404. In response to the second type of request, ReTSO 110 returns a commit timestamp (T_C) 408. In response to the third type of request, ReTSO 110 returns a true/false/retry response 412. To fulfill requests 402, 406, and 410, ReTSO 110 includes, but is in no way limited to, TO 112, recent commits list 420, T_MAX 430, start timestamp list 440, and half-aborted list 450. Each of the modules 112, 420, 430, 440 and 450, as illustrated in FIG. 4, may be integrated into ReTSO 110. However, in other embodiments, modules 112, 420, 430, 440, and 450 may be external to ReTSO 110 and remain merely communicatively coupled with ReTSO 110 and with each other.

ReTSO 110 fulfills start timestamp requests 402 by querying TO 112 and returning a start timestamp (T_S) 404 returned by TO 112. In one embodiment, ReTSO 110 stores all start timestamps in a start timestamp list 440. As mentioned earlier, TO 112 is responsible for generating unique timestamps in ascending temporal order. Therefore, a starting timestamp is a unique identifier of each transaction; TO 112 ensures that no two transactions will have the same starting timestamp as each other's.

Recent commits list 420, which includes rows 422-1 through 422-P (collectively rows 422) and which include of row identifiers (row ids) 424-1 through 424-P (collectively row ids 424), row versions 426-1 through 426-P (collectively row versions 426), and row commit times (RCTs) 428-1 through 428-P (collectively RCTs 428). Recent commits list 420 may be limited to the last P committed rows that fit into cache/memory. Row versions 426 are the start timestamps of committed transactions that most recently wrote to the corresponding rows. RCTs 428 are the commit timestamps of committed transactions that most recently wrote to the corresponding rows.

Recent commits list 420 may be too large to remain cached in its entirety; therefore, ReTSO 110 reduces the size of recent commits list 420 by retaining, in list 420, only a specified quantity of rows that have the latest timestamps, and performing garbage collection on the rest of the rows in recent commits list 420. The specified amount of time may be constant or variable. However, to ensure that ReTSO 110 may still satisfy commit requests 406 or transaction queries 410, ReTSO 110 maintains T_MAX 430. T_MAX 430 is the maximum timestamp of all the entries removed from volatile memory in this manner. For example, if rows 422-1, 422-2, and 422-3 were about to be removed from recent commits list 420 based on inactivity, and if RCT 428-3 was greater than either RCT 428-1 or RCT 428-2, then T_MAX 430 would be updated to equal RCT 428-3. Upon a subsequent request to read from or commit to rows previously represented as rows 422-1 through 422-3 in recent commits list 420, ReTSO may use T_MAX 430 (since the RCTs of rows 422-1 through 422-3 are no longer ascertainable from list 420) to determine whether a commit request is successful or not. Under some circumstances, this approach may result in aborting a transaction that would have otherwise been committed if the rows relevant to the transaction requesting commitment had not yet been evicted from recent commits list 420. Thus, the approach may be viewed as being abundantly cautious in nature, preferring the relatively lesser inconvenience of unnecessary abortion over the relatively greater harm of inappropriate commitment.

The start timestamp list 440 stores previously generated start timestamps for previous start timestamp requests 402 that are still not committed nor aborted, i.e., in-progress transactions. Upon advancing T_MAX 430, the start timestamp list 440 is used to determine which starting timestamps, i.e., transactions, should be moved to the half-aborted list 450.

The half-aborted list 450 stores the start timestamps of transactions that have taken too long to commit due to a failing client, or has failed in some other way. Half-aborted list 450 is used by ReTSO 110 to resolve transaction queries 410, discussed later. Half-aborted list 450 contains the starting timestamps of aborted transactions that have not been cleaned up. It is assumed that clients 120 and servers 130 will suffer periodic failures; thus, ReTSO 110 maintains half-aborted list 450 in order to determine or track which transactions may have been prematurely aborted. Specifically, when T_MAX 430 advances due to garbage collection of the recent commits list 420, ReTSO 110 checks for any uncommitted transactions in the start timestamp list 440 for which T_MAX 430 is greater than the respective timestamp, and adds the transaction, or its starting timestamp, to the half-aborted list 450.

Example Start Timestamp Request Process

Any of clients 120 may query ReTSO 110 with a start timestamp request 402. ReTSO 110, in turn, queries TO 112, which returns T_S 404. As is discussed above, TO 112 guarantees that each starting timestamp is unique and is assigned in increasing order. Thus, each transaction will have a unique identifier, which is the starting timestamp (T_S) 404 resulting from the start timestamp request 402. Furthermore, when timestamps between two competing transactions are compared (e.g., two timestamps stored in ReTSO 110, a timestamp and T_MAX 430, or two timestamps in other scenarios), the two timestamps compared will never be equal. A first timestamp will always be less than, or greater than, a second timestamp. According to an embodiment, if the first timestamp is assigned prior to the second timestamp, then the first timestamp will be less than the second timestamp.

Example Commit Request Process

Figure 5:
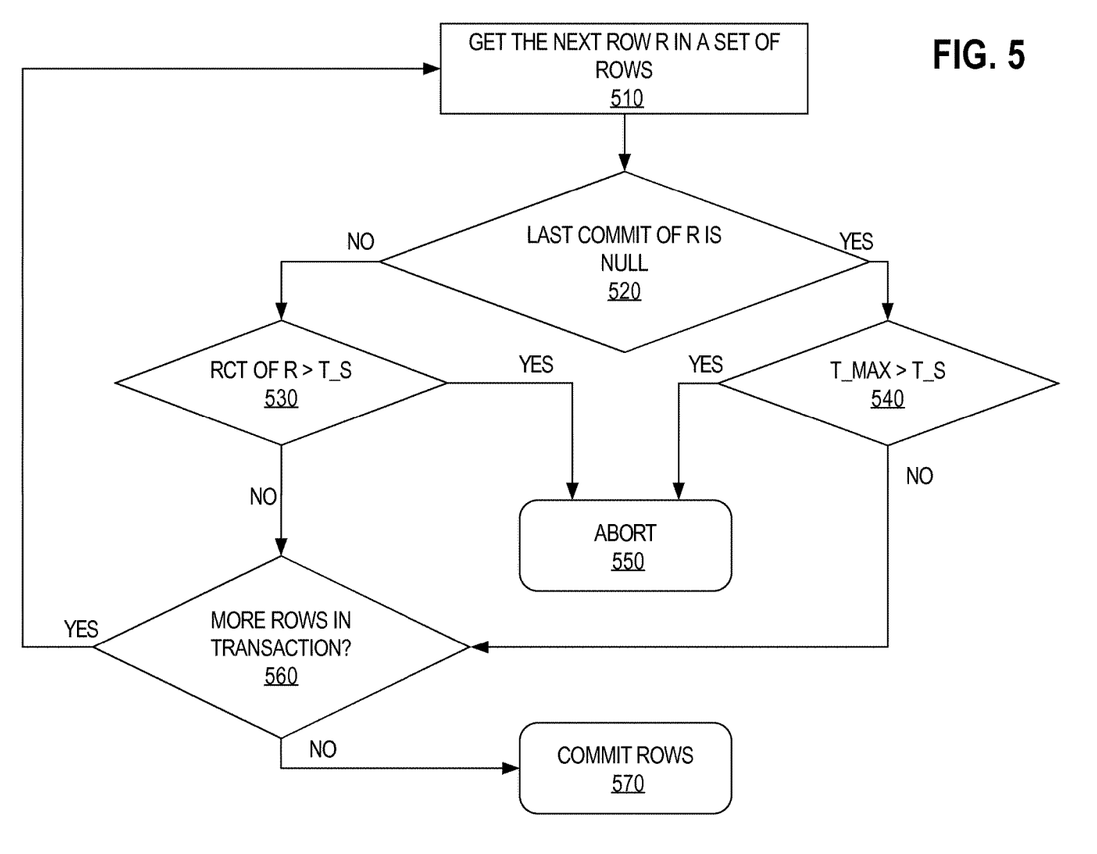
FIG. 5 is a flowchart of a reliable efficient transaction status oracle procedure to process commit requests, according to one embodiment.

FIG. 5 is a flowchart of a ReTSO 110 procedure to process commit requests 406, according to one embodiment. While FIG. 5 illustrates steps according to one embodiment, other embodiments may omit, add to, reorder, and/or modify any of the steps shown. In step 510, ReTSO 110 receives a transaction, and retrieves one of rows 422, which corresponds with a row in the transaction that is to be committed.

In step 520, ReTSO 110 determines whether the commit timestamp (RCT) 428-1, of the latest row version 426-1, of row 422-1, with row id 424-1, is null. RCT 428-1 of Row 422-1 could be null if row 422-1 has not yet been created, has not yet been cached, has not be written to for a specified period of time, has been forced out of the cache due to the limited amount of available volatile memory, or due to some other reason.

If the result of the determination performed in step 520 is false (meaning row id 424-1 was found among rows 424), then ReTSO 110 compares RCT 428-1 of row 422-1 with the starting timestamp (T_S) of the transaction, in step 530. If RCT 428-1 of row 422-1 is greater than T_S, then ReTSO 110 will abort the transaction, in step 550. Otherwise, if RCT 428-1 of row 422-1 is greater than T_S, then ReTSO 110 proceeds to step 560. In step 560, ReTSO 110 determines whether there are still more rows in the transaction that have not yet been determined to be conflicted or not. If there are more rows, then the process starts over again with step 510. Otherwise, the transaction is committed, in step 570. Step 570 concludes when ReTSO 110 returns T_C 408.

If the result of the determination performed in step 520 is true, then ReTSO 110 determines whether T_MAX 430 is greater than T_S, in step 540. In step 540, ReTSO 110 pessimistically aborts the transaction, which means that some transactions could unnecessarily abort. Pessimistic abortion may not be a point of concern where T_MAX 430 minus T_S is much greater than the maximum commit time. Assuming eight bytes for unique ids, the estimated required space to keep a row 422-1 data, including row id 424-1, start timestamp or row version 426-1, and RCT 428-1, is 32 bytes. Assuming 1 GB of volatile memory, 32 million rows will fit into volatile memory. If each transaction modifies eight rows on average, then the rows for the last 4 million transactions are in volatile memory. Assuming a maximum workload of 80K transactions per second ("TPS"), the row data for the last 50 seconds are in volatile memory, which is far more than the average commit time, i.e., around a second. Therefore, in many embodiments, a case where T_MAX 430 is greater than T_S rarely, if ever, occurs. If, however, T_MAX 430 is greater than T_S, in step 540, then the transaction is aborted, in step 550. Otherwise, ReTSO 110 determines whether there are still more rows in the transaction that have not yet been determined to be conflicted or not, in step 560, discussed above.

Transaction Queries

The third role of ReTSO 110 is to service queries regarding the status of transactions. Specifically, when a given transaction, txn-r, reads a row version associated with a row R that was written to by transaction txn-w, ReTSO 110 may be asked to determine whether txn-w was successfully committed. If txn-w is recently committed, the commit times of its rows (including R) are in ReTSO 110 volatile memory, i.e, if Ts(txn-w) is in volatile memory, ReTSO 110 verifies whether the commit time, Tc(txn-w), is less than the Ts(txn-r), otherwise txn-w is incomplete, aborted, or committed long time ago. To distinguish between these three cases, ReTSO 110 maintains a list of aborted transactions, half-aborted list 450. Half-aborted list 450 is garbage collected periodically so as to not fill up the volatile memory space. To do so, each aborted transaction sends a cleaned-up request to ReTSO 110 after it has cleaned up its aborted rows. ReTSO 110 then removes the transaction id from the half-aborted list.

A transaction query 410 returns true, false, or retry, (collectively 412) based on the state of recent commit list 420, T_MAX 430, start timestamp list 440, and half-aborted list 450. If neither the recent commits list 420 nor the half-aborted list 450 contains information about a transaction, at least one of three cases holds true about the transaction: 1) The transaction was committed a long time ago and the transaction data has been garbage collected (and that is why it is not present in the recent commit list 420); 2) the transaction was aborted and the rows were cleaned up, but a transaction, txn-r, read the row before the cleanup (and that is why it is not present in the half-aborted list 450); or 3) the transaction was neither committed nor aborted. To distinguish between the first and the last cases, ReTSO 110 uses half-aborted list 450 to also (in addition to maintaining the list of transactions that are aborted normally) keep track of the transactions that are forced to abort because the transaction did not commit in a timely manner, i.e., before T_MAX 430 advanced to the respective transaction's start timestamp. Each time a new start timestamp is assigned by ReTSO 110, via the TO 112, the start timestamp is recorded in start timestamp list 440. After commit (step 570 of FIG. 5) or abort (step 560 of FIG. 5), the start timestamp of the transaction is removed from start timestamp list 440. Furthermore, once T_MAX 430 advances due to garbage collection of recent commits list 420, ReTSO 110 also checks for any uncommitted transactions in the start timestamp list for which T_MAX 430 is greater than, and adds the timestamps to half-aborted list 450. In this manner, the third case is eliminated since the start timestamp of the in-progress transaction is either larger than T_MAX 430 or moved to half-aborted list 450. Because ReTSO 110 still cannot distinguish between the first and the second case, it returns retry. In both cases, retrying the read transaction from servers 130 resolves the problem: if the particular row version is still present at servers 130, then the writing transaction has been committed, otherwise the writing transaction has been aborted.

Figure 6:
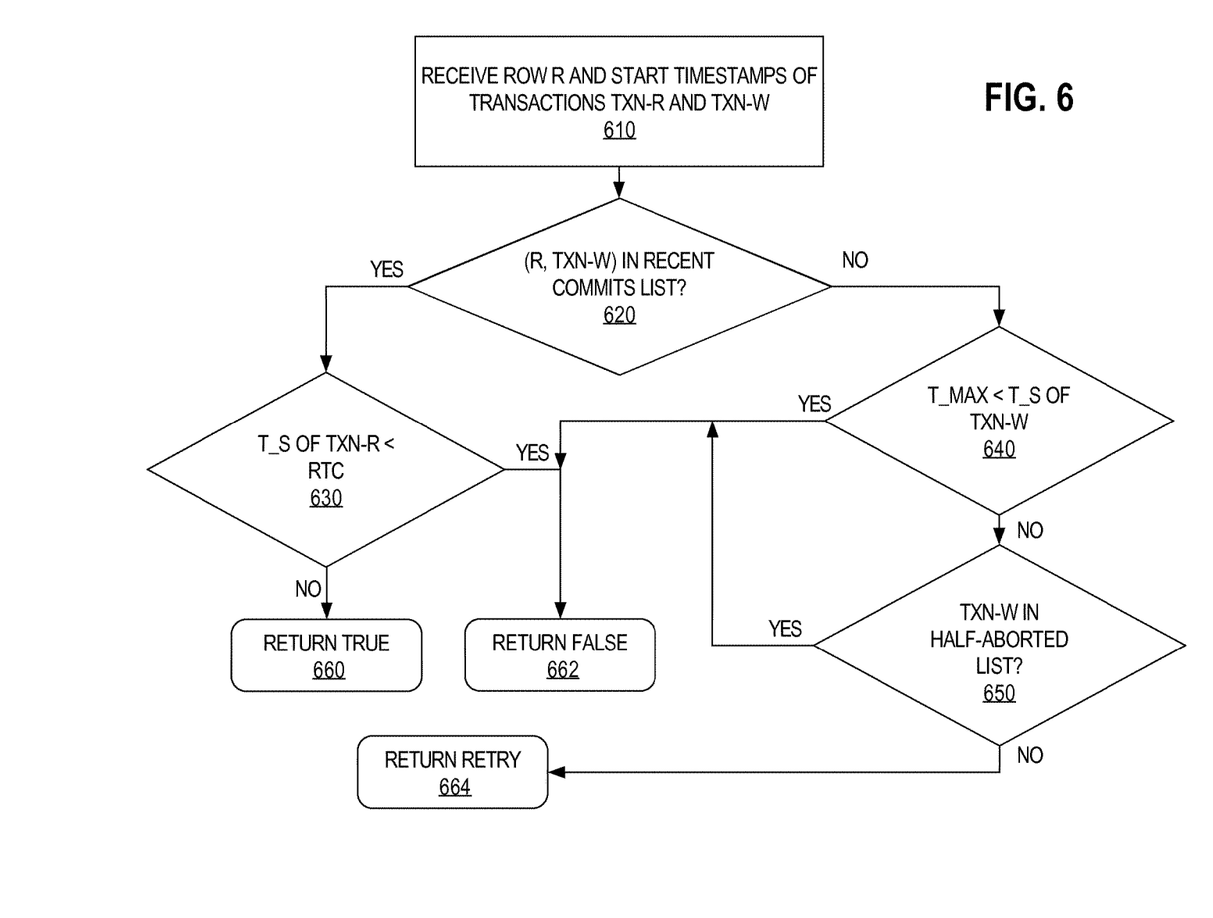
FIG. 6 is a flowchart illustrating a procedure to verify that a transaction has been committed, according to one embodiment.

FIG. 6 is a flowchart illustrating a procedure to verify if a transaction has been committed, according to one embodiment, which verifies that a transaction has been committed and returns true, false, or retry 412. While FIG. 6 illustrates steps according to one embodiment, other embodiments may omit, add to, reorder, and/or modify any of the steps shown.

In step 610, ReTSO receives a transaction (TXN-R) that has read a row version of a row R in database 102 written by a write transaction (TXN-W), and must determine whether TXN-W has been committed before TXN-R starts. In step 620, ReTSO 110 determines whether TXN-W is stored in recent commits list 420. If so, then ReTSO 110 may proceed to step 630, to determine whether the TWN-W was committed before TXN-R starts. Otherwise ReTSO 110 must determine whether TXN-W failed to commit, or whether TXN-R must retry, or re-read, row R.

In step 630, the ReTSO 110 found row 422-1 where row id 424-1 was equal to the identifier of row R and row version 426-1 is equal to the starting timestamp of TXN-W. ReTSO 110 then determines whether the starting time stamp (T_S) of TXN-R is less than RCT 428-1. If so, then false is returned, in step 662; otherwise TXN-W was successfully committed before TXN-R read row R, and ReTSO 110 returns true, in step 660.

If, however, in step 620, row 422-1, with row id 424-1 equal to the identifier of R, was not found, then ReTSO 110 must determine whether T_MAX 430 is less than the start timestamp (T_S) of TXN-W, in step 640. If not, then control passes to step 650.

In step 650, if TXN-W is in half-aborted list 450, then ReTSO 110 returns false in step 662. If, however, in step 650, TXN-W is not in half-aborted list 450, then either the transaction TXN-W was successfully committed so long ago that it is no longer in ReTSO 110 volatile memory, or TXN-W was already aborted and cleaned up, thus ReTSO 110 returns retry, instructing the client 120-1 to re-read the row from server 130-1, in step 664.

Processing Overhead

In some of the embodiments, the number of random memory accesses, i.e., reading and writing into committed state, can be burdensome to system 100. Since the data accessed by different transactions do not exhibit spatial locality, the data is not likely to be in the processor caches (such as L2 cache) and consequently has to be read from volatile memory. To keep the number of volatile memory accesses to a minimum, in one embodiment, sorting and garbage collection is only performed on the recently accessed data. Furthermore, it may be preferable to avoid using pointers since following a pointer implies jumping to a new random position in volatile memory, which will probably not be loaded into the processor cache.

Hash maps are efficient data structures to increase performance. Hash maps reduce the average volatile memory access for each lookup to one, or big-O(1). A hash map associates each hash value with a bucket, where each bucket contains all items that map to the same key. The key is used to generate a unique hash value, which is obtained by applying a hash function on the key. According to one embodiment, linked lists are used to maintain the elements in a bucket.

In one embodiment, a hash map is used, such that a hash map of row ids 424 is used to maintain the committed state, and each hash map item contains the start timestamp 426-1 and RCT 428-1. Although a key is the combination of row id 424-1 and start timestamp 426-1, in one embodiment, the hash value is computed only on the row id 424-1 In another embodiment a put operation may be implemented to ensure the first hash map item, in a bucket, with row id 424-1 has the most recent commit timestamp of row R. This feature can be efficiently implemented because, after a put operation, the items of the linked list are already loaded into the processor cache and switching the items is cheaply performed in the processor cache. Step 530, in FIG. 5, benefits from this method since the first hash map item in the bucket, for row 422-1, that matches the row id 424-1 may be used to compare whether RCT 428-1 of row 422-1 is greater than the starting timestamp (T_S) of the transaction that has yet to be committed.

In one embodiment, the size of the hash map is fixed, proportional to the size of volatile memory, periodically garbage-collecting old items of the hash map is necessary. Current garbage collection policies require further random accesses to volatile memory, which exacerbates the average processing time of requests. In yet another embodiment, to further reduce average volatile memory access for each transaction, a lazy, auto-garbage collector hash map is implemented. The disposal of an old row 422-1 in the map is postponed to a time that the item is already loaded into the processor cache, i.e., once there is a hit for a put operation. After such a hit, the other items with the same key, and thus the same hash value, are already loaded into the processor cache and can be garbage-collected cheaply.

Data Reliability

If ReTSO 110 server fails, a new instance of ReTSO 110 may recreate the volatile memory state from a write-ahead log ("WAL"). In one embodiment, ReTSO 110 persists changes into a WAL before updating the volatile memory state. In other embodiments, the WAL is also replicated across multiple remote storage devices to prevent loss of data after a storage failure. Writing into multiple remote machines may be expensive and it is important to prevent replication of the WAL from becoming a bottleneck. In one embodiment, Apache Bookkeeper™ (found at the world wide web domain zookeeper.apache.org, in directory, bookkeeper), is used, which can efficiently perform up to 20,000 writes of size 1028 bytes per second into a WAL. Since ReTSO 110 requires frequent writes into the WAL, multiple writes could be batched with no perceptible increase in processing time. With a batching factor of 10, BookKeeper™ is able to persist data of 200K transactions per second ("TPS").

Processing a commit request 406 involves two parts, checking the current volatile memory state for conflicts, and changing the state based on a new commit. These two steps must be performed atomically. The write into the WAL before updating the volatile memory state, in step 570 of FIG. 5, induces a non-trivial latency in service time. Thus, in one embodiment, ReTSO 110 postpones writes into the WAL until after updating the volatile memory state, in step 570. The response T_C 408, to the user, however, is sent only after the asynchronous write into the WAL terminates. In the case ReTSO 110 crashes and loses its volatile memory state, the recovered volatile memory state from the WAL encompasses all the changes that clients 120 have observed.

When processing queries associated with read transactions, the state of ReTSO 110 volatile memory might have values that must still be written to the WAL. In one embodiment, to guarantee that the state is persisted, for each read query, ReTSO 110 also performs a null write into the WAL to flush the channel between ReTSO 110 and the WAL. ReTSO 110 sends the rows to clients 120 or servers 130 only after receiving an acknowledgement from BookKeeper™, which implies that all the previous pending writes into the WAL have also been persisted. This step ensures that the state observed by the read query is persisted into the WAL and is amenable to recovery.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
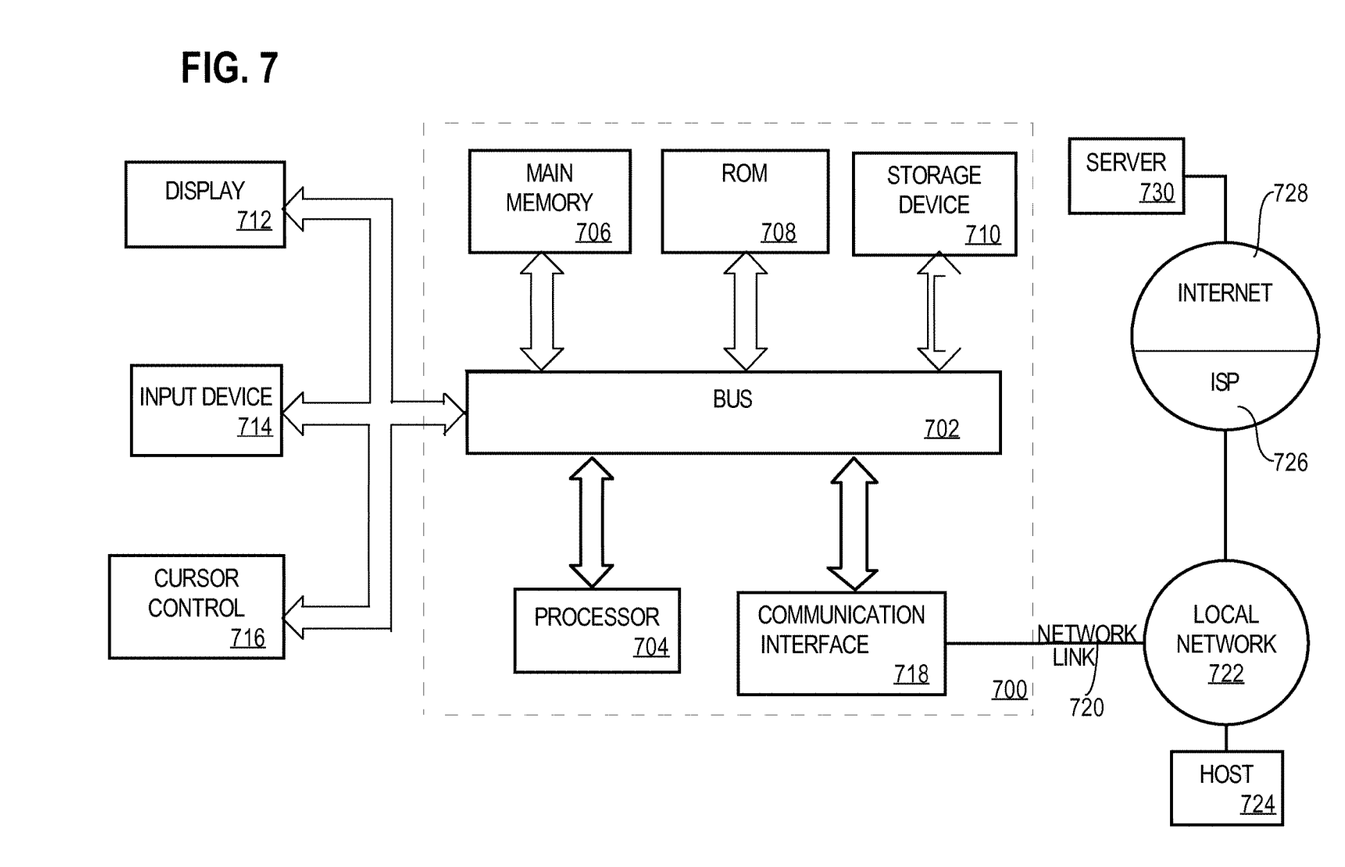
FIG. 7 illustrates a computer system upon which an embodiment may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
one or more processors;
a memory coupled to the one or more processors;
wherein the one or more processors, in conjunction with the memory, implement:
   a recent commits data store configured to maintain a set of recent commit entries, each of which indicates a commit timestamp of a committed transaction and a row identifier that identifies a row in a database table;
   a timestamp logic configured to generate a timestamp that is not equal to any timestamp previously generated;
   a transaction status logic, coupled to the recent commits data store and the timestamp logic, and is configured to:
      receive a first request for a starting timestamp to read a set of one or more rows, and in response, return a started timestamp generated by the timestamp logic;
      receive a second request to commit an updated version of the set of one or more rows, and in response:
         for each row in the set of one or more rows:
            determine a particular row identifier for the row;
            query the recent commits data store for an entry with the particular row identifier and a commit timestamp; and
            determine whether the started timestamp is after the commit timestamp of the entry if the recent commits data store returns the entry with a commit timestamp;
         receive a committed timestamp from the timestamp logic; and
         return the committed timestamp.

2. The system of claim 1, wherein the transaction status logic is further configured to receive the committed timestamp from the timestamp logic in response to determining that no row in the set of one or more rows that has a row identifier that is included in an entry of the set of recent commit entries has a started timestamp that is before the commit timestamp of any entry in the set of recent commit entries that includes the row identifier of the row.

3. The system of claim 1, wherein:
the started timestamp is a first started timestamp;
the set of one or more rows is a first set of rows;
the first set of rows includes a particular row;
the transaction status logic is further configured to:
   in response to receiving the second request, store a particular entry in the set of recent commit entries for the particular row, wherein the row identifier is the particular row identifier for the particular row and the commit timestamp is the committed timestamp;
   receive a third request for a second starting timestamp to read a second set of one or more rows, wherein the second set of one or more rows includes the particular row;
   in response to receiving the third request, receive a second started timestamp generated by the timestamp logic;
   receive a fourth request to commit an updated version of the second set of one or more rows;
   in response to receiving the fourth request:
      determine the row identifier for the particular entry is equal to the particular row identifier for the particular row;
      determine the second started timestamp is less than the commit timestamp of the particular entry;
      abort committing the second set of one or more rows.

4. The system of claim 3, wherein the transaction status logic is configured to return a retry response as at least part of aborting committing the second set of one or more rows.

5. The system of claim 3, wherein:
the first request and second request are received from a first client computer; and
the third request and the fourth request are received from a second client computer.

6. The system of claim 1, wherein:
the set of one or more rows comprises a first subset of rows and a second subset of rows, wherein the first subset of rows are stored on a first server and the second subset of rows are stored on a second server; and
the transaction status logic is further configured to, in response to receiving the committed timestamp:
   update the first subset of rows on the first server; and
   update the second subset of rows on the second server.

7. The system of claim 1, wherein the transaction status logic is further configured to:
after receiving the committed timestamp, persist the particular row identifier for each row in the set of one or more rows and the committed timestamp to a write-ahead log; and
after persisting the particular row identifier for each row in the set of one or more rows and the committed timestamp to the write-ahead log, return the committed timestamp.

8. The system of claim 1, wherein:
the started timestamp is a first started timestamp;
the set of one or more rows is a first set of rows;
the first set of rows includes a particular row;
the transaction status logic is further configured to:
   in response to receiving the second request, store a particular entry in the set of recent commit entries for the particular row, wherein the row identifier is the particular row identifier for the particular row and the commit timestamp is the committed timestamp;
   remove a subset of entries from the set of recent commit entries, wherein the subset of entries includes the particular entry;
   determine a latest committed timestamp from among the entries in the subset of entries, wherein the latest committed timestamp is greater than or equal to the commit timestamp of the particular entry;
   update a maximum timestamp to indicate the latest committed timestamp;
   receive a third request for a second starting timestamp to read a second set of one or more rows, wherein the second set of one or more rows includes the particular row;
   in response to receiving the third request, receive a second started timestamp generated by the timestamp logic;
   receive a fourth request to commit an updated version of the second set of one or more rows;
   determine the second started timestamp is less than the maximum timestamp, and in response, abort committing the second set of one or more rows.

9. The system of claim 8, wherein the transaction status logic is further configured to store a set of start timestamp entries in the recent commits data store, each of which indicates a start timestamp of a transaction that has neither committed nor aborted.

10. The system of claim 9, wherein the transaction status logic is further configured to:
store a set of half-aborted entries, each of which indicates a start timestamp of a transaction that has aborted;
for each entry in the set of start timestamp entries:
compare the start timestamp of said each entry with the maximum timestamp,
add, to the set of half-aborted entries, an entry that corresponds to said each entry if the maximum timestamp is greater than the start timestamp of said each entry.

11. A method comprising:
maintaining a set of recent commit entries, each of which indicates a commit timestamp of a committed transaction and a row identifier that identifies a row in a database table;
receiving a first request for a starting timestamp to read a set of one or more rows;
in response to receiving the first request, generating a started timestamp;
receiving a second request to commit an updated version of the set of one or more rows;
in response to receiving the second request:
for each row in the set of one or more rows:
determining a particular row identifier for the row;
if the particular row identifier is equal to a row identifier of an entry in the set of recent commit entries, then determining whether the started timestamp is after the commit timestamp of the entry;
generating a committed timestamp; and
returning the committed timestamp;
wherein the method is performed by one or more computing devices.

12. The method of claim 11 further comprising generating the committed timestamp in response to determining that no row in the set of one or more rows that has a row identifier that is included in an entry of the set of recent commit entries has a started timestamp that is before the commit timestamp of any entry in the set of recent commit entries that includes the row identifier of the row.

13. The method of claim 11, wherein:
the started timestamp is a first started timestamp;
the set of one or more rows is a first set of rows;
the first set of rows includes a particular row;
further in response to receiving the second request:
storing a particular entry in the set of recent commit entries for the particular row, wherein the row identifier is the particular row identifier for the particular row and the commit timestamp is the committed timestamp;
the method further comprising:
receiving a third request for a second starting timestamp to read a second set of one or more rows, wherein the second set of one or more rows includes the particular row;
in response to receiving the third request, generating a second started timestamp;
receiving a fourth request to commit an updated version of the second set of one or more rows;
in response to receiving the fourth request:
determining the row identifier for the particular entry is equal to the particular row identifier for the particular row;
determining the second started timestamp is less than the commit timestamp of the particular entry;
causing to abort committing the second set of one or more rows.

14. The method of claim 13, wherein causing to abort committing the second set of one or more rows comprises returning a retry response.

15. The method of claim 13 further comprising:
receiving the first request and second request from a first client computer; and
receiving the third request and the fourth request from a second client computer.

16. The method of claim 11 further comprising:
the set of one or more rows comprising a first subset of rows and a second subset of rows, wherein the first subset of rows are stored on a first server and the second subset of rows are stored on a second server; and
in response to receiving the committed timestamp:
updating the first subset of rows on the first server; and
updating the second subset of rows on the second server.

17. The method of claim 11, wherein:
after generating the committed timestamp, persisting the particular row identifier for each row in the set of one or more rows and the committed timestamp to a write-ahead log; and
after persisting the particular row identifier for each row in the set of one or more rows and the committed timestamp to the write-ahead log, returning the committed timestamp.

18. The method of claim 11, wherein:
the started timestamp is a first started timestamp;
the set of one or more rows is a first set of rows;
the first set of rows includes a particular row;
the method further comprising:
storing, further in response to receiving the second request, a particular entry in the set of recent commit entries for the particular row, wherein the row identifier is the particular row identifier for the particular row and the commit timestamp is the committed timestamp;
removing a subset of entries from the set of recent commit entries, wherein the subset of entries includes the particular entry;
determining a latest committed timestamp from among the entries in the subset of entries, wherein the latest committed timestamp is greater than or equal to the commit timestamp of the particular entry;
updating a maximum timestamp to indicate the latest committed timestamp;
receiving a third request for a second starting timestamp to read a second set of one or more rows, wherein the second set of one or more rows includes the particular row;
in response to receiving the third request, generating a second started timestamp;
receiving a fourth request to commit an updated version of the second set of one or more rows;
determining the second started timestamp is less than the maximum timestamp, and in response, aborting committing the second set of one or more rows.

19. The method of claim 18 further comprising:
storing a set of start timestamp entries, each of which indicates a start timestamp of a transaction that has neither committed nor aborted.

20. The method of claim 19 further comprising:
storing a set of half-aborted entries, each of which indicates a start timestamp of a transaction that has aborted;
for each entry in the set of start timestamp entries:
  comparing the start timestamp of said each entry with the maximum timestamp,
  adding, to the set of half-aborted entries, an entry that corresponds to said each entry if the maximum timestamp is greater than the start timestamp of said each entry.

* * * * *